United States Patent [19]

Tsuda et al.

[11] 4,008,946
[45] Feb. 22, 1977

[54] POINTER PROJECTING MEANS FOR MICROSCOPES

[75] Inventors: Hiroshi Tsuda, Mitaka; Toshimi Hayasaka, Hino, both of Japan

[73] Assignee: Olympus Optical Co., Ltd., Tokyo, Japan

[22] Filed: July 9, 1975

[21] Appl. No.: 594,556

[30] Foreign Application Priority Data

July 13, 1974 Japan .............................. 49-80591
Sept. 10, 1974 Japan ............................ 49-103423

[52] U.S. Cl. .................................. 350/10; 350/33; 356/252
[51] Int. Cl.² .......................................... G02B 27/36
[58] Field of Search ..................... 350/10, 33, 35; 356/251, 252

[56] References Cited

UNITED STATES PATENTS

| | | | |
|---|---|---|---|
| 2,377,064 | 5/1945 | Aufiero | 350/10 X |
| 3,552,819 | 1/1971 | Mandler | 350/10 |
| 3,582,178 | 6/1971 | Boughton et al. | 350/10 |

Primary Examiner—David H. Rubin
Attorney, Agent, or Firm—Cushman, Darby & Cushman

[57] ABSTRACT

A pointer projecting means arranged to project the light from a pointer, which is formed on a first reflecting mirror, by means of a projecting lens to a position near an image formed by a microscope after reflecting said light by a second reflecting mirror and further reflecting by the first reflecting mirror, the projecting position of the pointer being changed by rotating the first reflecting mirror.

6 Claims, 3 Drawing Figures

POINTER PROJECTING MEANS FOR MICROSCOPES

Background of the Invention a. Field of the invention

The present invention relates to a pointer projecting means for pointing a position of an object to be observed which is to be used in microscopes arranged so that the object can be observed by a plural number of observers at the same time and used, for example, for educational purposes.

b. Description of the prior art

Known pointer means used for the above kind of microscopes are arranged as follows. One is a pointer means on which an arrowhead is drawn and which is movably arranged at a position near the object to be observed or at the position of the image of the object focused by the objective. Another one is a pointer projecting means comprising a pointer means, on which an arrowhead is drawn, and a light source arranged outside the optical path of the optical system of the microscope, said pointer projecting means being arranged to project the image of said arrowhead by overlapping it with the image of the object by using a semi-transparent mirror arranged in the optical system of the microscope. The above-mentioned known means, however, have disadvantages as described below. In case of the former means, a movable pointer means having an arrowhead is arranged in the optical system of the microscope. Therefore, said pointer means covers the object and it is inconvenient for observation of the object. In case of the latter means, it is necessary to arrange so that the projected image of the arrowhead is moved to point the desired portion of the image of the object by moving the light source and pointer means integrally. Therefore, it is necessary to move or rotate the pointer projecting means and, consequently, the pointer projecting means as a whole necessarily becomes complicated and large in size.

Summary of the Invention

It is, therefore, a primary object of the present invention to provide a pointer projecting means comprising a first reflecting mirror on which a transparent pointer is formed and a second reflecting mirror and arranged to move the projected image of said pointer by rotating said second reflecting mirror.

Another object of the present invention is to provide a pointer projecting means comprising a first reflecting mirror on which a transparent pointer is formed, a second reflecting mirror and a projecting lens and arranged to move the projected image of said pointer by integrally rotating said first and second reflecting mirrors and projecting lens.

Detailed Description of the Preferred Embodiments

Figure 1:
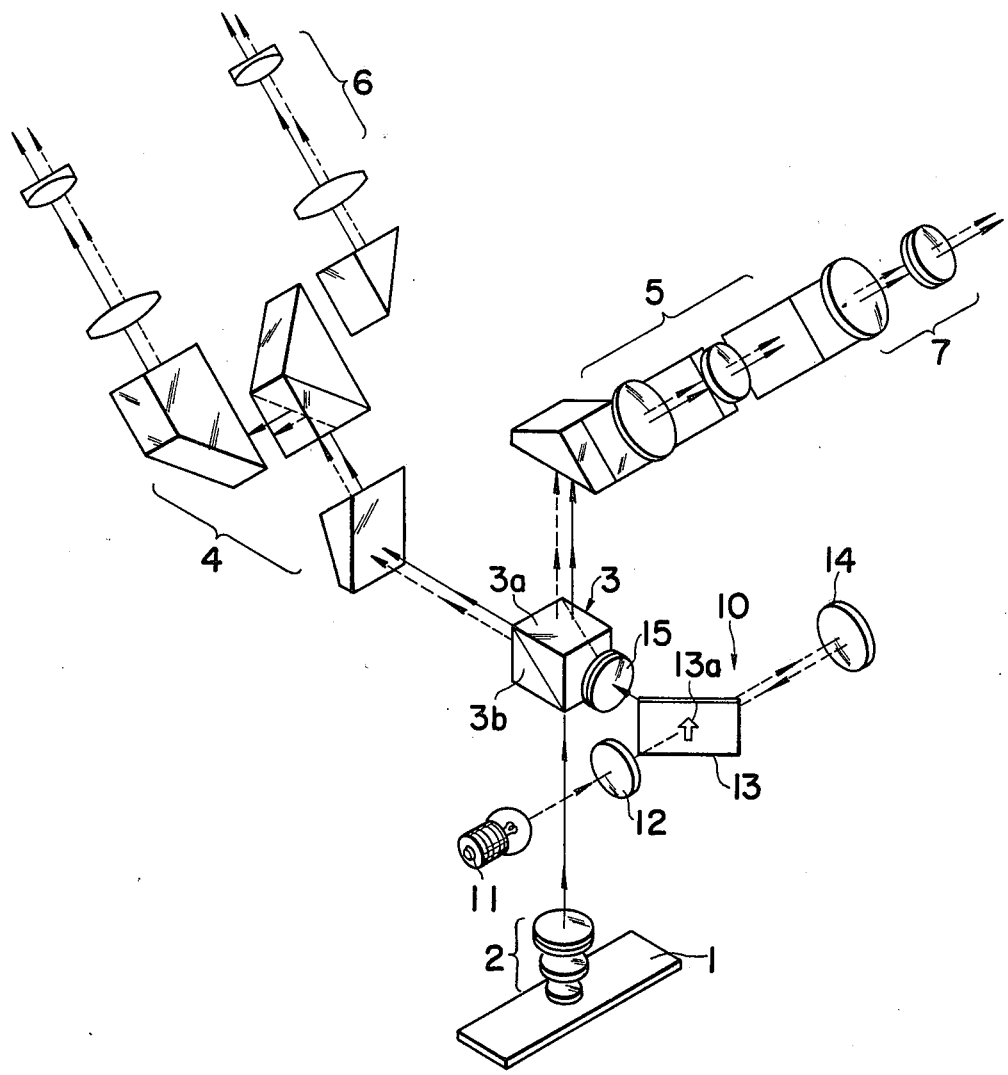
FIG. 1 shows a diagrammatic view showing the arrangement of the optical system of the microscope comprising the optical system of the pointer projecting means according to the present invention.

Referring to FIG. 1, numeral 1 designates an object to be observed which is arranged to be illuminated by an illuminating means of a microscope which is not shown. Numeral 2 designates an objective. Numeral 3 designates a beam splitter comprising prisms 3a and 3b and arranged to direct the light from the object, which passed through the objective lens 2, to two different directions, i.e., to the direction in which the light passes through the beam splitter and to the direction in which the light is reflected by the beam splitter. Numerals 4 and 5 respectively designate two prism means, and numerals 6 and 7 respectively designate eyepieces. The optical system of the microscope is arranged by said objective 2, beam splitter 3, prism means 4 and 5 and eyepieces 6 and 7. Numeral 10 designates the pointer projecting means according to the present invention comprising a light-source lamp 11, a condensing lens 12, a first reflecting mirror 13 having a pointer, a second reflecting mirror 14 and a projecting lens 15. In said pointer projecting means, the first reflecting mirror 13 has a pointer 13a, which is formed as an arrowhead-shaped transparent portion, at a position near the center of the first reflecting mirror 13.

In the microscope arranged as above, the light beam from the object is directed by the beam splitter 3 to two different directions, i.e., to the direction in which the light is reflected by the beam splitter and to the direction in which the light passes through the beam splitter. The light reflected by the beam splitter 3 is then directed to the eyepiece 6, the direction of its optical path being changed by the prism means 4. The light passed through the beam splitter 3 is then directed to the eyepiece 7, the direction of its optical path being changed by the prism means 5. Therefore, by using respective eyepieces 6 and 7, two different persons can observe, at the same time, the images of the same object formed by the objective 2. On the other hand, the light from the light-source lamp 11 of the pointer projecting means 10 illuminates, by means of the condensing lens 12, the first reflecting mirror 13 which is arranged by inclining in respect to the optical axis of the pointer projecting means 10. Out of said light, only the portion which illuminates the pointer 13a passes through said first reflecting mirror 13. The light which passed through the first reflecting mirror 13 as above is reflected by the second reflecting mirror 14, further reflected by the first reflecting mirror 13 and, directed to the projecting lens 15. The light passed through the projecting lens 15 as above is directed by the beam splitter 3 to two different directions, i.e., to the direction in which the light passes through the beam splitter 3 and to the direction in which the light is reflected by the beam splitter 3, and forms projected images of the shape same as that of the pointer 13a at positions near the above-mentioned images of the object which are formed by the objective. Therefore, both of respective observers who are observing by means of respective eyepieces are to observe said projected images of the pointer 13a together with images of the object.

When the second reflecting mirror 14 is rotated round a point on the optical axis of the optical system of the pointer projecting means or when the first reflecting mirror 13, second reflecting mirror 14 and projecting lens 15 are integrally rotated round a point near the center of the first reflecting mirror by keeping relative positions of the first and second reflecting mirrors and projecting lens constant, the position of the image of the pointer 13a on the first reflecting mirror 13 projected by the projecting lens 15 changes and, therefore, it is possible to point a desired position of the enlarged image of the object by means of the image of the pointer.

Figure 2:
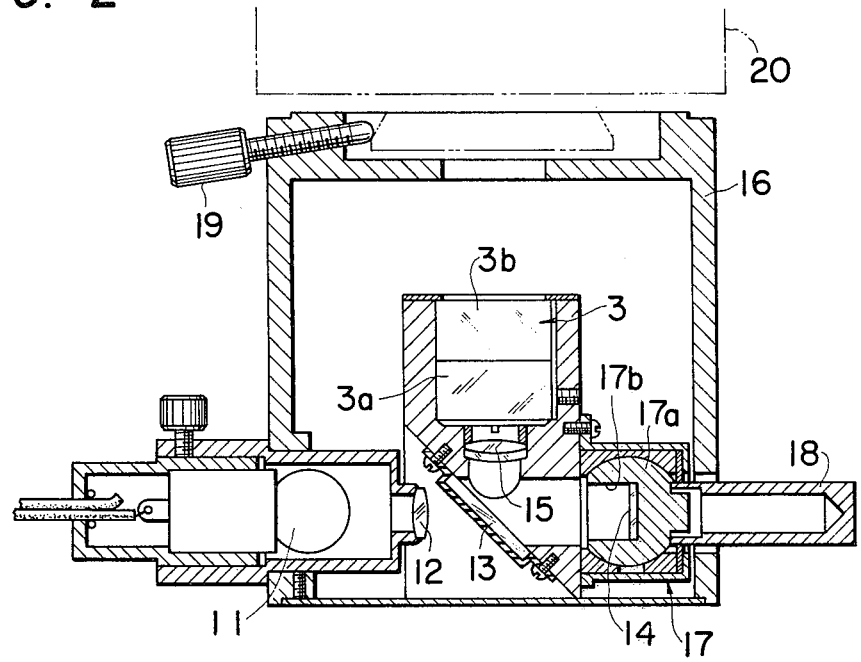
FIG. 2 shows a sectional view of a first embodiment of the present invention.

In the following, the concrete construction of the pointer projecting means according to the present invention is described referring to respective embodiments. In FIG. 2 showing a first embodiment, the beam splitter 3, light-source lamp 11, condensing lens 12, etc. are same as those which are already shown in the optical system illustrated in FIG. 1 and their functions are as described in the above. Numeral 16 designates a case to which the pointer projecting means according to the present invention is mounted. Numeral 17 designates a universal joint comprising a ball member 17a having a concave portion 17b in which the second reflecting mirror 14 is fixed. Numeral 18 designates a pointer operating handle connected to said ball member 17a. By said pointer operating handle 18, the ball member 17a is rotated in order to rotate the second reflecting mirror 14, which is fixed to the ball member, round a point. The other optical elements are fixed to the case 16 as shown in FIG. 2. The pointer projecting means 10 constructed as described in the above is used as follows. That is, the pointer projecting means 10 is mounted at a position above the lens mount, i.e., the objective of the microscope. On the side opposite to the objective, i.e., above the plane which includes the drawing showing FIG. 2, one of eyepieces is fixed and the other eyepiece is fixed to one side of the pointer projecting means 10, as shown by the chain line 20, by suitable fixing means such as a screw 19.

By the pointer projecting means constructed as described in the above, images of the pointer are formed and moved as described below. That is, as already described referring to FIG. 1, the light passed through the pointer 13a, out of the light from the light-source lamp 11 illuminating the first reflecting mirror 13, is reflected by the second reflecting mirror 14, further reflected by the first reflecting mirror 13 and directed to the projecting lens 15. The light passed through the projecting lens 15 is directed by the beam splitter 3 to two defferent direction as described in the above. The light reflected by the beam splitter 3 is directed to the direction vertical to the plane including the drawing showing FIG. 2, i.e., to one of eyepieces. The light passed through the beam splitter 3 is directed toward the upper side in FIG. 2, i.e., to the other eyepiece. Thus, images of the pointer are formed by overlapping with respective images of the object. When the second reflecting mirror 14 is rotated by operating the pointer operating handle 18 of the pointer projecting means, it is possible to change the direction of the light passed through the pointer 13a and reflected by the second reflecting mirror 14 and, consequently, the images of the pointer 13a formed by the projecting lens 15 can be moved. Therefore, by operating the pointer operating handle 18, it is possible to point the desired position of the enlarged images of the object, which are formed by the microscope objective, by means of the projected images of the pointer.

Figure 3:
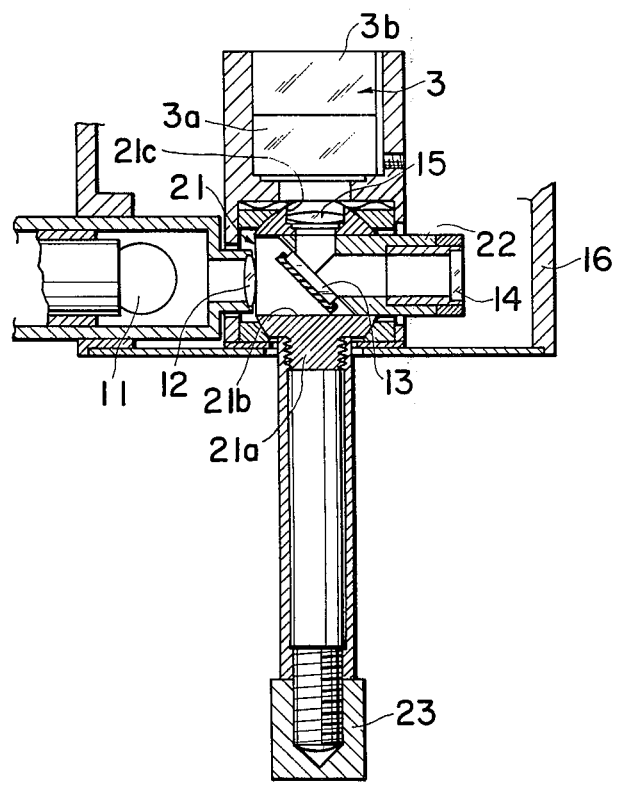
FIG. 3 shows a sectional view of a second embodiment of the present invention.

Now, FIG. 3 shows a second embodiment of the pointer projecting means according to the present invention. In said FIG. 3, the beam splitter 3, light-source lamp 11, condensing lens 12, etc. are same as those which are explained already. Numeral 16 designates a case to which the pointer projecting means according to the present invention is mounted. Numeral 21 designates a universal joint comprising a ball member 21a which has a through hole 21b. Numeral 22 designates a holding tube holding the first reflecting mirror 13 and second reflecting mirror 14. By said holding tube 22, the first reflecting mirror 13 is arranged by inclining in respect to the axial line of the holding tube 22 and the second reflecting mirror 14 is arranged in the direction perpendicular to said axial line. Said holding tube 22 is inserted into the through hole 21b of the ball member 21a. Besides, the universal joint 21 has a hole 21c, which leads to the through hole 21b and is provided for the purpose of mounting the projecting lens 15. The projecting lens 15 is fixed into said hole 21c. Numeral 23 designates a pointer operating handle mounted to the ball member 21a and arranged to rotate the ball member 21a.

By the second embodiment constructed as above, the projected images of the pointer 13a provided to the first reflecting mirror 13 move, as already explained based on the optical system shown in FIG. 1, when the pointer operating handle 23 is operated to rotate the ball member 21a in order to integrally rotate the first reflecting mirror 13, second reflecting mirror 14 and projecting lens 15 which are fixed to said ball member 21a. Therefore, by operating the pointer operating handle 23, it is possible to point the desired position of the enlarged images of the object attained by the microscope.

As explained in the above, the pointer projecting means according to the present invention does not have such disadvantages, unlike known means, that the pointer covers the image of the object to cause inconvenience in observation, the operating mechanism becomes large and complicated, and so forth. The pointer projecting means according to the present invention is extremely simple in construction and small in size and, therefore, can be operated quite easily. Moreover, the second embodiment has various further advantages as described below. That is, in the second embodiment, relative positions of the object to be projected, i.e., the pointer which is provided to the first reflecting mirror and the projecting lens are always kept in the same relationship even when the pointer projecting means is rotated. Therefore, the projected image of the pointer does not become worse even when the image of the pointer is moved. Besides, the image of the pointer moves in the direction same as the operating direction of the operating handle. Therefore, it is very convenient for moving the pointer of the image to the position desired to be pointed.

Moreover, as for the shape of the pointer 13a formed on the first reflecting mirror 13, it is of course possible to adopt any desired shape other than the arrowhead shape. When the pointer 13a is arranged as graduation lines, it is possible to measure the size of the object by projecting those graduation lines.

In the above embodiments, the pointer projecting means according to the present invention is described for cases when it is mounted to a microscope arranged to that two observers can observe at the same time. It is, however, of course possible to apply the pointer projecting means according to the present invention also to microscopes in general and to such microscopes which are arranged so that many observers can observe at the same time.

We claim:

1. A pointer projecting means comprising a microscope objective, a beam splitter arranged on the optical axis of said objective, a first eyepiece for observing a first image of an object formed by said objective after the light from said object passes through said beam splitter, a second eyepiece for observing a second image of the object formed by said objective after the light from the object is reflected by said beam splitter, a first reflecting mirror having a patterned transparent portion and positioned out of the optical axis of said object, means for directing light through said patterned transparent portion to form a pointer image, a second reflecting mirror for reflecting the pointer image back to said first reflecting mirror, a projecting lens, said first reflecting mirror reflecting the pointer image to said projecting lens, said projecting lens transmitting the pointer image to said beam splitter whereby a first image of the pointer is formed by said projecting lens near the first image of the object through reflection by said beam splitter, and a second image of the pointer is formed by said projecting lens near the second image of the object by transmission through said beam splitter, and including means for angularly adjusting at least said second reflecting mirror for effecting pointer image movement.

2. A pointer projecting means according to claim 1 arranged to move said first and second images of said pointer formed by said projecting lens, wherein said means for angularly adjusting at least said said second reflecting mirror comprises rotatable mounting means provided for said second reflecting mirror whereby the reflecting angle of said second reflecting mirror with respect to said first reflecting mirror is altered by rotating said second reflecting mirror.

3. A pointer projecting means according to claim 2 further comprising a case for housing said first and second reflecting mirrors and said projecting lens, a universal joint mounted in said case and having a ball member, said ball member having a concave portion for fixing said second reflecting mirror, and a pointer operating handle mounted to said ball member, said second reflecting mirror being rotated by rotating said ball member by operating said pointer operating handle.

4. A pointer projecting means according to claim 1 wherein said means for angularly adjusting at least said second reflecting mirror comprises means for integrally rotating said first and second reflecting mirrors and said projecting lens.

5. A pointer projecting means according to claim 4 further comprising a case for housing said first and second reflecting mirrors, a universal joint mounted in said case and having a ball member, said ball member having a through hole for arranging said first reflecting mirror at the middle portion of said through hole and another hole leading to said through hole and accommodating said projecting lens, a holding tube inserted and fixed to said through hole of said ball member and holding said second reflecting mirror, and a pointer operating handle fixed to said ball member, said first and second reflecting mirrors and said projecting lens being integrally rotated by rotating said ball member by operating said pointer operating handle.

6. A pointer projecting means according to claim 1 in which said patterned transparent portion of said first reflecting mirror comprises at least one graduation line whereby said pointer images formed therefrom facilitate measurements on said object images.

* * * * *